(12) United States Patent
Agin (10) Patent No.: US 7,130,640 B2
(45) Date of Patent: *Oct. 31, 2006

(54) METHOD OF MANAGING PROCESSING RESOURCES IN A MOBILE RADIO SYSTEM

(75) Inventor: Pascal Agin, Sucy en Brie (FR)

(73) Assignee: Evolium S.A.S., Paris (FR)

(*) Notice: Subject to any disclaimer, the term of this patent is extended or adjusted under 35 U.S.C. 154(b) by 594 days.

This patent is subject to a terminal disclaimer.

(21) Appl. No.: 10/074,000

(22) Filed: Feb. 14, 2002

(65) Prior Publication Data

US 2002/0119785 A1     Aug. 29, 2002

(30) Foreign Application Priority Data

Feb. 23, 2001 (FR) ................................. 01 02527

(51) Int. Cl.
*H04Q 7/20* (2006.01)
*H04L 12/26* (2006.01)

(52) U.S. Cl. ............. 455/453; 455/432.1; 455/452.2; 370/230; 370/329; 370/331; 370/335

(58) Field of Classification Search ............. 455/423, 455/445, 67.11, 453, 405, 454, 452.1, 452.2; 370/230, 395.2, 335, 465, 468, 495, 229, 370/237, 238, 329, 331
See application file for complete search history.

(56) References Cited

U.S. PATENT DOCUMENTS

| 5,818,871 | A  | * | 10/1998 | Blakeney et al. ............ 375/220 |
| 6,233,231 | B1 | * | 5/2001  | Felix et al. .................. 370/335 |
| 6,434,380 | B1 | * | 8/2002  | Andersson et al. ......... 455/406 |
| 6,636,497 | B1 | * | 10/2003 | Honkasalo et al. ......... 370/335 |
| 6,738,624 | B1 | * | 5/2004  | Aksentijevic et al. .... 455/452.1 |
| 6,996,401 | B1 | * | 2/2006  | Agin ........................... 455/453 |
| 2002/0119784 | A1 | * | 8/2002 | Agin ........................... 455/453 |
| 2004/0053597 | A1 | * | 3/2004 | Agin ........................... 455/405 |

FOREIGN PATENT DOCUMENTS

| GB | 2 347 317 A | 8/2000 |
| WO | WO00/33589 | 6/2000 |
| WO | WO00/54536 | 9/2000 |

OTHER PUBLICATIONS

"[European Telecommunications Standards Institute: Technical Specification—Universal mobile Telecommunications System (UMTS); UTRAN lub Interface NBAP Signaling (3G TS 25.443 version 3.2.0 Release 1999)" ETSI TS 125 433 V3.2.0, Jun. 2000 XP002166441].*

(Continued)

*Primary Examiner*—Charles N. Appiah
(74) *Attorney, Agent, or Firm*—Sughrue Mion, PLLC (57) ABSTRACT

A method of managing processing resources in a mobile radio system, in which a first entity manages radio resources and corresponding processing resources, the latter being provided in a second entity separate from the first entity, in which method:

the second entity signals to the first entity its global processing capacity, or capacity credit, and the consumption law, or amount of said global processing capacity, or cost, for different spreading factor values, the first entity updates the capacity credit on the basis of the consumption law, and in the case of variable spreading factor and/or variable number of spreading codes, said updating is effected on the basis of a reference spreading factor and/or a reference number of spreading codes.

32 Claims, 3 Drawing Sheets

OTHER PUBLICATIONS

Minn et al. "Dynamic Assignment of Orthogonal Variable-Spreading Factor Codes in W-CDMA" IEEE Journal on Selected Area in Communications, Aug. 2000, vol. 18, Issue 8, pp. 1429-1440.*

European Telecommunications Standards Institute: "Technical Specification; Universal Mobile Telecommunications System (UMTS); UTRAN lub Interface NBAP Signalling (3G TS 25.433 Version 3.2.0 Release 1999)" ETSI TS 125 433 V3.3.0, XX, XX, Jun. 2000.

* cited by examiner

FIG_2

FIG_3

FIG_4

METHOD OF MANAGING PROCESSING RESOURCES IN A MOBILE RADIO SYSTEM

The present invention relates generally to mobile radio systems and more particularly to systems using the code division multiple access (CDMA) technique.

BACKGROUND OF THE INVENTION

The CDMA technique is used in third generation systems such as the Universal Mobile Telecommunication System (UMTS).

Figure 1:
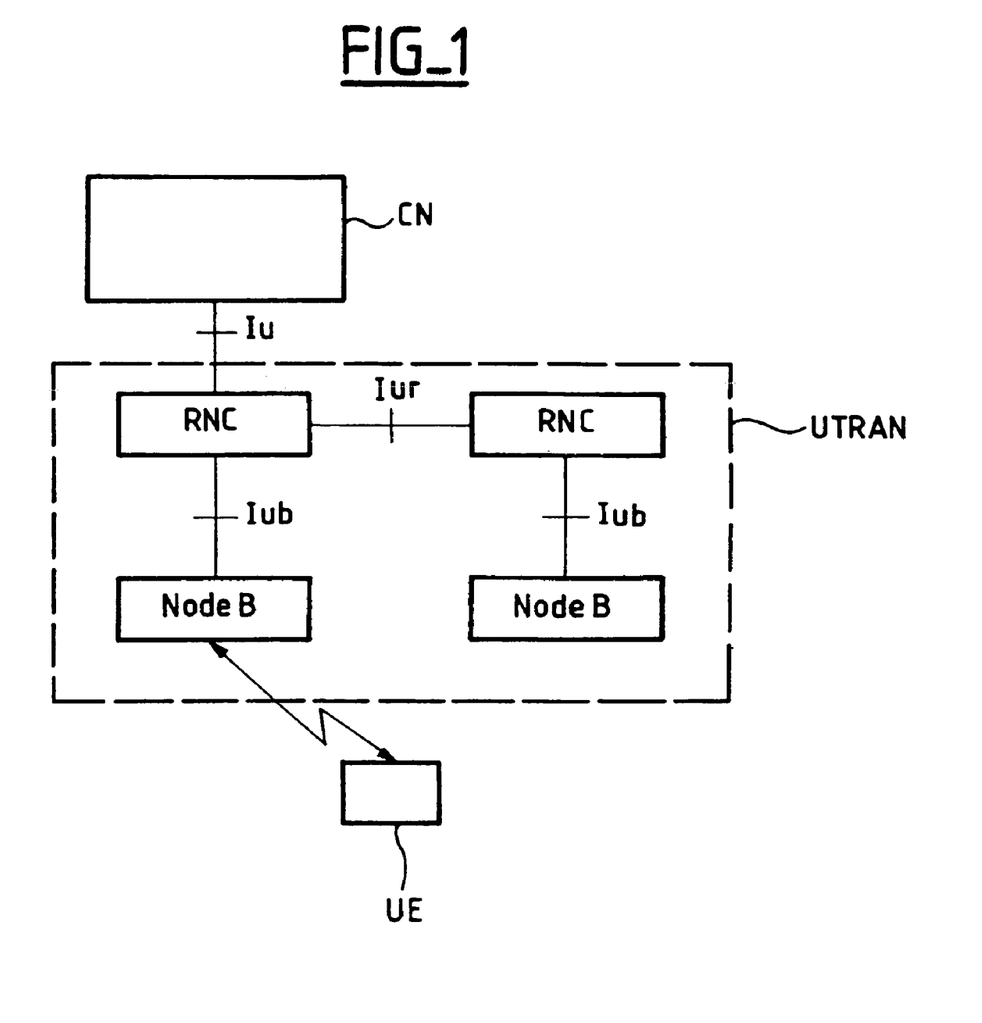
FIG. 1, already described, shows the general architecture of a mobile radio system such as the UMTS, FIGS. 2 and 3, already described, respectively show the main processing operations used in a base station, such as a UMTS Node B, when sending and when receiving.

As shown in FIG. 1, a mobile radio network generally includes a set of base stations and base station controllers. In the UMTS, this network is called the UMTS terrestrial radio access network (UTRAN), a base station is called a Node B. and a base station controller is called a radio network controller (RNC).

The UTRAN communicates both with mobile stations, which are called user equipments (UE), via a Uu interface, and with a core network (CN) via an Iu interface.

As shown in FIG. 1, the RNCs are connected:
to the Node B via an Iub interface,
to each other via an Iur interface, and
to the core network CN via an Iu interface.

The RNC that controls a given Node B is called the controlling radio network controller (CRNC) and the CRNC is therefore connected to the Node B via the Iub interface. The CRNC has a load control function and a radio resource allocation control function for the Node B that it controls.

The RNC for a given call relating to a given user equipment UE is called the serving radio network controller (SRNC) and is connected to the core network CN via the Iu interface. The SRNC has a control function for the call concerned, including functions of adding or removing radio links (in accordance with the macrodiversity transmission technique) and monitoring parameters that may change during a call, such as bit rate, power, spreading factor, etc.

In CDMA systems radio interface capacity limitations are fundamentally different from those of systems using other multiple access techniques, such as the time division multiple access (TDMA) technique. The TDMA technique is used in second generation systems such as the Global System for Mobile communications (GSM). In CDMA systems, all users share the same frequency resource at all times. The capacity of these systems is therefore limited by interference, and for this reason these systems are known as soft limited systems.

This is why CDMA systems use algorithms, such as load control algorithms which prevent, detect and if appropriate correct overloads, in order to prevent quality being degraded, and call admission control algorithms which decide if the capacity of a cell not being used at a given time is sufficient to accept a new call in that cell (as a function of various parameters such as the service required for that call, etc.). In the following description these algorithms are referred to generically as load control algorithms.

These algorithms usually use only radio criteria and are usually implemented in the CRNC, which has no information about the processing capacity of each Node B that it controls. This being the case, it is possible for a new call to be accepted by the CRNC but in the end to be rejected for want of Node B processing resources, for example, which leads to unnecessary additional processing in the CRNC and additional exchanges of signaling between the CRNC and the Node B.

Of course, it would be possible to avoid these problems by providing the Node B with sufficient processing resources to cover all situations, including that of maximum capacity (corresponding to the case of a very low level of interference). But this would lead to costly base stations which would have more capacity than necessary most of the time. In addition, in the case of progressive introduction of the services offered by these systems, the processing capacity of the base stations may be limited when the systems begin to be put into service, and then progressively increased afterwards.

It would therefore be desirable for load control in this kind of system to allow for the base station (Node B) processing capacity.

Figure 2:
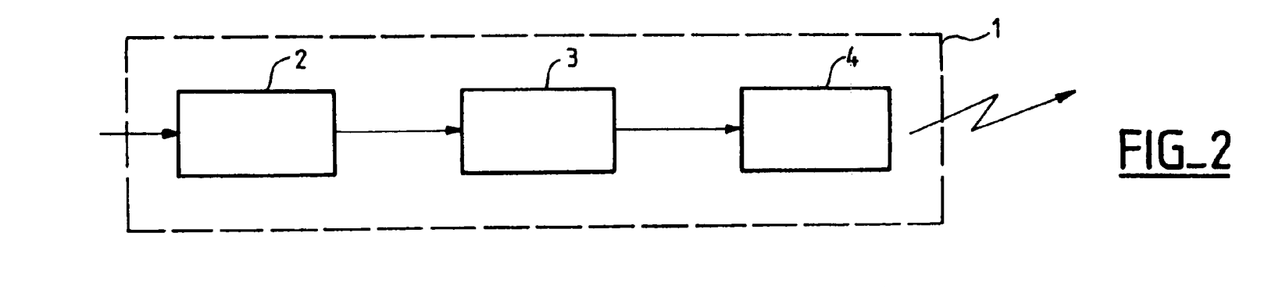
Figure 3:
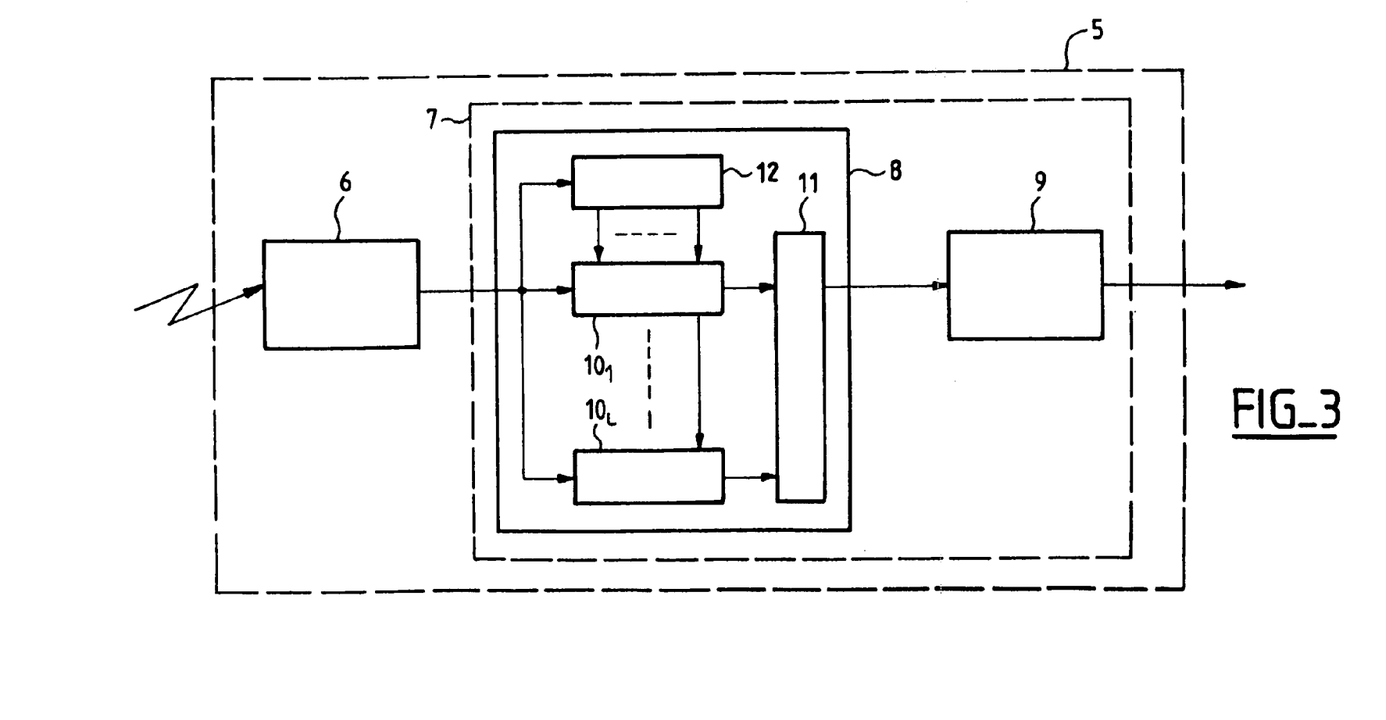

FIGS. 2 and 3 respectively show the main sending and receiving processing operations used in a base station, such as a Node B in the UMTS, for example.

FIG. 2 shows a sender 1 including:
channel coder means 2,
spreader means 3, and
radio frequency transmitter means 4.

The various processing operations are familiar to the person skilled in the art and do not need to be described in detail here.

Channel coding uses techniques such as error corrector coding and interleaving to protect against transmission errors. This is known in the art.

Coding (such as error corrector coding) introduces redundancy into the information sent. The coding rate is defined as the ratio of the number of information bits to be sent to the total number of bits sent or coded. Various levels of quality of service can be obtained using different types of error corrector code. For example, in the UMTS, a first type of error corrector code used for a first type of traffic (such as high bit rate data) is a turbo code and a second type of error corrector code used for a second type of traffic (such as voice or data at a lower bit rate) is a convolutional code.

Channel coding usually also includes bit rate adaptation to match the bit rate to be sent to the bit rate offered for sending it. Bit rate adaptation can include techniques such as repetition and/or puncturing, the bit rate adaptation rate being then defined as the repetition rate and/or puncturing rate.

The raw bit rate is defined as the bit rate actually passing over the radio interface. The net bit rate is the bit rate obtained after deducting from the raw bit rate everything that is not useful to the user, in particular redundant bits introduced by coding.

Spreading uses the well known principles of spectrum spreading. The length of the spreading code used is called the spreading factor.

In a system such as the UMTS in particular, the net bit rate also referred to hereinafter simply as the "bit rate") can vary during a call and the spreading factor can vary as a function of the bit rate to be sent.

FIG. 3 shows a receiver 5 including:
radio frequency receiver means 6, and
received data estimator means 7, including despreader means 8 and channel decoder means 9.

The above processing operations are also familiar to the person skilled in the art and therefore do not need to be described in detail here.

FIG. 3 shows one example of the processing that can be carried out in the despreader means 8. Here the processing corresponds to that used in a Rake receiver to improve the quality of received data estimation by exploiting multipath phenomena, i.e. propagation of the same source signal along multiple paths, due in particular to multiple reflections from objects in the environment. In CDMA systems, unlike TDMA systems in particular, the multipath phenomenon can be used to improve the quality of received data estimation.

A Rake receiver includes a set of L fingers $10_1$ to $10_L$ and combiner means for combining signals from the various fingers. Each finger despreads the signal received over one of the various paths determined by estimator means 12 for estimating the impulse response of the transmission channel. The combiner means 11 combine the despread signals corresponding to the respective paths using a processing operation for optimizing the quality of received data estimation.

The technique of reception using a Rake receiver is also used in conjunction with the macrodiversity transmission technique, whereby the same source signal is sent simultaneously to the same mobile station by a plurality of base stations. The macrodiversity transmission technique not only improves reception performance, through using a Rake receiver, but also minimizes the risk of call loss in the event of a handover. For this reason it is also known as soft handover, as opposed to the hard handover technique whereby a mobile station is connected to only one base station at any given time.

The received data estimator means can also use various techniques for reducing interference, for example the multi-user detection technique.

A plurality of receive antennas can also be used. The received data estimator means then further include combiner means for combining signals obtained from the receive antennas, again in such a manner as to optimize the quality of received data estimation.

Channel decoding includes functions such as de-interleaving and error corrector decoding. Error corrector decoding is generally much more complex than error corrector coding, and can use techniques such as maximum likelihood decoding. A Viterbi algorithm can be used for convolutional codes, for example.

To be able to process several users simultaneously, a Node B includes a set of senders and receivers, such as the sender and the receiver referred to above. Thus a Node B requires a high processing capacity, in particular in the receiver, for received data estimation As previously indicated, it is therefore desirable if load control in a system such as the UMTS, for example takes account of the base station Processing capacity.

In the case of the UMTS, the document 3G -TS 25.433 published by the 3GPP ($3^{rd}$ Generation Partnership Project) provides for the Node B to signal to the CRNC its overall processing capacity (called its capacity credit) and the amount of that capacity credit (called the cost) for each value of the spreading factor SF available in the system. The total cost for the available spreading factors is called the capacity consumption law. A rode B signals this information to the CRNC each time that the processing capacity of the Node B changes, by means of a "Resource Status Indication" message, or in response to a request from the CRNC, by means of an "Audit Response" message.

The CRNC then updates the remaining credit, on the basis of the consumption law, in particular, in the UMTS:

for the dedicated channels, during the radio link set-up radio, link addition, radio link deletion and radio link reconfiguration procedures defined in the document 3G TS 25.433 published by the 3GPP, and for the common channels, during the common transport channel set-up, common transport channel deletion and common transport channel reconfiguration procedures defined in the document 3G TS 25.433 published by the 3GPP.

The above procedures are called Node E Application Part (NBAP) procedures and the corresponding signaling messages are called NBAP messages.

Two different consumption laws are defined in the 3G TS 25.433 standard, one for the dedicated channels and one for the common channels. A dedicated channel is a channel assigned to a given user and a common channel is a channel shared between several users. For example, the UMTS includes a dedicated channel (DCH) and common channels including a random access channel (RACH), forward access channel (FACH), common packet channel (CPCH), downlink shared channel (DSCH), etc.

The applicant has noticed that the credit mechanism described in the current version of the 3G TS 25.433 standard still causes problems.

A first problem is that no account is taken of the specific nature of the DSCH.

Although the DSCH is in fact a common channel, it is always associated with a dedicated channel DCH, and set-up, deletion and reconfiguration procedures concerning the DSCH simultaneously concern the DCH. For example, for a radio link set-up operation, either one or two operations can be effected: one operation for the DCH and, if a DSCH is associated with the DCH, one operation for the DSCH.

Accordingly, even though the DSCH is a common channel, to simplify the capacity credit updating operations, it would be more logical for this channel to be taken into account in the consumption law for the dedicated channels.

However, the allocation cost for the dedicated channels is different according to whether the radio link concerned is a first radio link or not (the latter situation applies if the UE has more than one radio link in the same Node B, i.e. if the UE is in a soft handover situation with that Node B). Accordingly the 3G TS 25.433 standard specifies two costs that are taken into account for a first radio link, namely a Radio Link cost (RL cost) and a Radio Link Set cost (RLS cost); for an additional radio link, only the RL cost is taken into account.

The soft handover or softer handover technique is generally not used for the common channels, and in particular for the DSCH. The DSCH therefore gives rise to particular problems with applying the credit mechanism, which require a solution.

OBJECTS AND SUMMARY OF THE INVENTION

An object of the present invention is to provide a solution to these problems.

Thus in one aspect the present invention provides a method of managing processing resources in a mobile radio system, in which a first entity manages radio resources and corresponding processing resources, the latter being provided in a second entity separate from the first entity, in which method:

the second entity signals to the first entity its global processing capacity, or capacity credit, and the consumption law, or amount of said global processing capacity, or cost, as a function of the necessary resources, the first entity updates the capacity credit on the basis of the consumption law, for radio resources corresponding to dedicated channels, different allocation costs apply to a first radio link and to an additional radio link, for radio resources corresponding to a common channel associated with a dedicated channel, said updating is effected, in the case of a first radio link, on the basis of the cost for the dedicated channel and a cost for the associated common channel and, in the case of an additional radio link, on the basis of the cost for the dedicated channel only.

According to another feature:

in the case of a dedicated channel, the cost for a first radio link includes a cost for a radio link and an additional cost, and the cost for an additional radio link includes only the cost for a radio link;

in the case of a common channel associated with a dedicated channel, said cost for the associated common channel corresponds to the cost of a radio link for the dedicated channel.

According to another feature, said cost for the associated common channel is specific to that channel.

According to another feature, said common channel associated with a dedicated channel is a Downlink Shared CHannel (DSCH).

According to another feature, the cost is a function of the spreading factor.

In another aspect the present invention provides a mobile radio system for implementing the above method, in which system:

in the case of radio resources corresponding to a common channel associated with a dedicated channel, the first entity includes means for updating the capacity credit, in the case of a first radio link, on the basis of the cost for the dedicated channel and a cost for the associated common channel and, in the case of an additional radio link, on the basis of the cost for the dedicated channel only.

According to another feature, said first entity is a base station controller.

According to another feature, said second entity is a base station.

In a further aspect the present invention provides a base station controller for a mobile radio system for implementing the above method, said base station controller essentially including:

in the case of radio resources corresponding to a common channel associated with a dedicated channel, means for updating the capacity credit, in the case of a first radio link, on the basis of the cost for the dedicated channel and a cost for the associated common channel and, in the case of an additional radio link, on the basis of the cost for the dedicated channel alone.

A second problem is that the current standard does not indicate how the above credit mechanism must take into account the variable spreading factor and/or variable number of spreading codes (in the case of multicode transmission).

In the UMTS, the spreading factor and/or the number of spreading codes used (in the case of multicode transmission) in the uplink direction can vary during a call. The quantity of processing resources necessary is not the same, depending on the spreading factor used and/or on the number of spreading codes used. It would therefore be desirable for the credit mechanism concerned to allow for this.

Another object of the present invention is to provide a solution to this problem.

In another aspect the present invention therefore provides a load control and/or call admission control method in a mobile radio system in which a first entity manages radio resources and corresponding processing resources, the latter being provided in a second entity separate from the first entity, in which method:

the second entity signals to the first entity its global processing capacity, or capacity credit, and the consumption law, or amount of said global processing capacity, or cost, as a function of the resources necessary, the first entity updates the capacity credit on the basis of the consumption law, and in the case of a variable spreading factor and/or a variable number of spreading codes, said updating is effected on the basis of a reference spreading factor and/or a reference number of spreading codes.

According to another feature, said reference spreading factor is a minimum spreading factor.

According to another feature, said reference number of spreading codes is a maximum number of spreading codes.

According to another feature, the minimum spreading factor has a predetermined value.

According to another feature, said predetermined value is a function in particular of the type of service.

According to another feature, said predetermined variable can be adjusted by operation and maintenance means.

According to another feature, said first entity consisting of a Controlling Radio Network Controller (CRNC) and, said predetermined minimum spreading factor value being determined in a separate entity consisting of a Serving Radio Network Controller (SRNC), the SRNC signals said predetermined value of the minimum spreading factor to the CRNC.

According to another feature, said minimum spreading factor has a calculated value.

According to another feature, said calculated value is obtained from a parameter corresponding to a transport format combination set (TFCS).

According to another feature, said first entity consisting of a controlling radio network controller (CRNC), said calculated value is calculated in the CRNC from said parameter signaled to the CRNC by a separate entity consisting of a serving radio network controller (SRNC).

According to another feature, said first entity consisting of a controlling radio network controller (CRNC), said calculated value is signaled to the CRNC by a serving radio network controller (SRNC) which calculates it for itself from said parameter.

In another aspect the present invention provides a mobile radio system for implementing the above method, in which system:

the first entity includes, in the case of a variable spreading factor and/or a variable number of spreading codes, means for effecting said updating on the basis of a reference spreading factor and/or a reference number of spreading codes.

According to another feature, said first entity is a base station controller.

According to another feature, said second entity is a base station.

In another aspect the present invention provides a base station controller for a mobile radio system for implementing the above method, said base station controller essentially including:

in the case of a variable spreading factor and/or variable number of spreading codes, means for effecting said updating on the basis of a reference spreading factor and/or a reference number of spreading codes.

According to another feature, said means for effecting said updating includes means for receiving a predetermined reference spreading factor and/or a reference number of spreading codes value signaled to said base station controller (CRNC) by a separate base station controller (SRNC).

According to another feature, said means for effecting said updating include means for calculating a reference spreading factor value from a parameter signaled to said base station controller (CRNC) by a separate base station controller (SRNC).

According to another feature, said means for effecting said updating include means for receiving a reference spreading factor value signaled to said base station controller (CRNC) by a separate base station controller (SRNC) which calculates it for itself.

A third problem is that the current standard does not indicate how the above credit mechanism must take account of multicode transmission.

As previously indicated, in the UMTS, multicode transmission can be used in the uplink or downlink direction and the quantity of processing resources necessary is different, depending on the number of spreading codes used. It would therefore be desirable for the credit mechanism concerned to allow for this.

Another object of the present invention is to provide a solution to this problem.

Thus in another aspect the present invention provides a method of managing processing resources in a mobile radio system in which a first entity manages radio resources and corresponding processing resources, the latter being provided in a second entity separate from the first entity, in which method:

the second entity signals to the first entity its global processing capacity, or capacity credit, and the consumption law, or amount of said global processing capacity, or cost, for different spreading factor values, the first entity updates the capacity credit on the basis of the consumption law, and in the case of multicode transmission using N spreading codes, said updating is effected on the basis of the cost for at least one of the N spreading codes.

According to another feature, the cost for the N codes corresponds to the sum of the costs for each of the N codes.

According to another feature, the cost for N codes is determined from the cost for one code.

According to another feature, the cost for N codes corresponds to N times the costs for one code.

According to another feature, the cost for N codes corresponds to the cost for the minimum spreading factor code.

In another aspect the present invention provides a mobile radio system for implementing the above method, in which system:

in the case of multicode transmission using N spreading codes, the first entity includes means for effecting said updating on the basis of the costs for at least one of the N spreading codes.

According to another feature, said first entity is a base station controller.

According to another feature, said second entity is a base station.

In another aspect the present invention provides a base station controller for a mobile radio system for implementing the above method, said base station controller essentially including:

means for effecting said updating on the basis of the cost for at least one of N spreading codes in the case of multicode transmission using N spreading codes.

A further object of the present invention is to propose a load control and/or call admission control method allowing for the processing capacity of a base station determined by the above credit mechanism.

Thus in another aspect the present invention provides a load control and/or call admission control method for use in a mobile radio system in which a first entity manages radio resources and corresponding processing resources, the latter being provided in a second entity separate from the first entity, in which method:

the second entity signals to the first entity its global processing capacity, or capacity credit, and the consumption law, or amount of said global processing capacity, or cost, as a function of the necessary resources, the first entity updates the capacity credit on the basis of the consumption law, and if the uplink and/or downlink capacity credit falls below a given first threshold, any new call is rejected until the capacity credit is again above a given second threshold greater than or equal to the first threshold.

In another aspect the present invention provides a mobile radio system for implementing the above method, in which system:

the first entity includes means for rejecting any new call if the uplink and/or downlink capacity credit falls below a given first threshold until the capacity credit is again above a given second threshold greater than or equal to the first threshold.

According to another feature, said first entity is a base station controller.

According to another feature, said second entity is a base station.

In another aspect the present invention provides a base station controller for a mobile radio communication system for implementing the above method, said base station controller including:

means for rejecting any new call if the uplink and/or downlink capacity credit falls below a given first threshold until the capacity credit is again above a given second threshold greater than or equal to the first threshold.

In another aspect the present invention provides a mobile radio system for implementing the above method, in which system:

the first entity includes means for rejecting any new call if the uplink and/or downlink capacity credit falls below a given first threshold until the capacity credit is again above a given second threshold greater than or equal to the first threshold.

In another aspect the present invention provides a mobile radio communication system for implementing the above method, in which system:

the first entity includes means for initiating an overload control procedure if the capacity credit falls below a given threshold.

According to another feature, said first entity is a base station controller.

According to another feature, said second entity is a base station.

In another aspect the present invention provides a base station controller for a mobile radio system for implementing the above method, said base station controller including:

means for initiating an overload control procedure if the capacity credit falls below a given threshold.

BRIEF DESCRIPTION OF THE DRAWINGS

Other objects and features of the present invention will become apparent after reading the following description of embodiments of the invention, which description is given with reference to the accompanying drawings, in which.

MORE DETAILED DESCRIPTION

Thus an object of the present invention is to solve various problems caused by the credit mechanism described in the current version of the 3G TS 25.433 standard.

A first problem is that no account is taken of the specific nature of the DSCH.

The solution in accordance with the invention to this first problem can be explained in the following terms.

Because the DSCH is always associated with a DCH, it may be preferable to take its processing cost into account in the dedicated channel consumption law.

Various solutions can be adopted:

- a specific cost is added into the consumption law for the DSCH, for a few spreading factor values or for all possible spreading factor values (the latter option being preferable, i.e. a cost per spreading factor, as is the case for the DCH),
- one of the costs specified for the Downlink DCH (DL DCH), i.e. the DL RL cost, is taken into account (note that only one downlink cost has to be taken into account because the DSCH is exclusively a downlink channel and the processing is usually significantly different for the Node B sender and receiver).

Because soft handover cannot be used for the DSCH, no additional resource is used for the DSCH if a new radio link is added. The preferred solution is therefore to add/change/remove a cost for the DSCH once only, if the NBAP messages concern a first radio link.

To be more precise:

- during a radio link set-up procedure, the DSCH cost (either a specific cost or the DL RL cost for the DCH, according to the two possibilities previously indicated) is debited from the capacity credit (this cost is debited once only, regardless of the number of radio links, unlike the DCH cost),
- during a radio link addition procedure, the capacity credit is not modified because of the DSCH (although it can be changed to take account of the DCH processing), and
- during a radio link reconfiguration procedure, the capacity credit is modified only once because of the DSCH (if the new DSCH cost is different from the old one), regardless of the number of radio links.

As a general rule, to solve this first problem the invention essentially provides for updating a common channel associated with a dedicated channel, in the case of a first radio link, on the basis of the cost for the dedicated channel and a cost for the associated common channel and, in the case of an additional radio link, on the basis of the cost for the dedicated channel only.

In an advantageous embodiment of the invention, if a physical downlink shared channel (PDSCH) is allocated in the radio link set-up procedure, the processing cost associated with the PDSCH, which is equal to the DL RL cost, is debited from the capacity credit, in addition to the radio link processing cost. Similarly, this cost is credited to the capacity credit if a PDSCH is deleted and the difference between the new cost and the old cost is debited from the capacity credit if a PDSCH is reconfigured (or credited to the capacity credit if the difference is negative).

Figure 4:
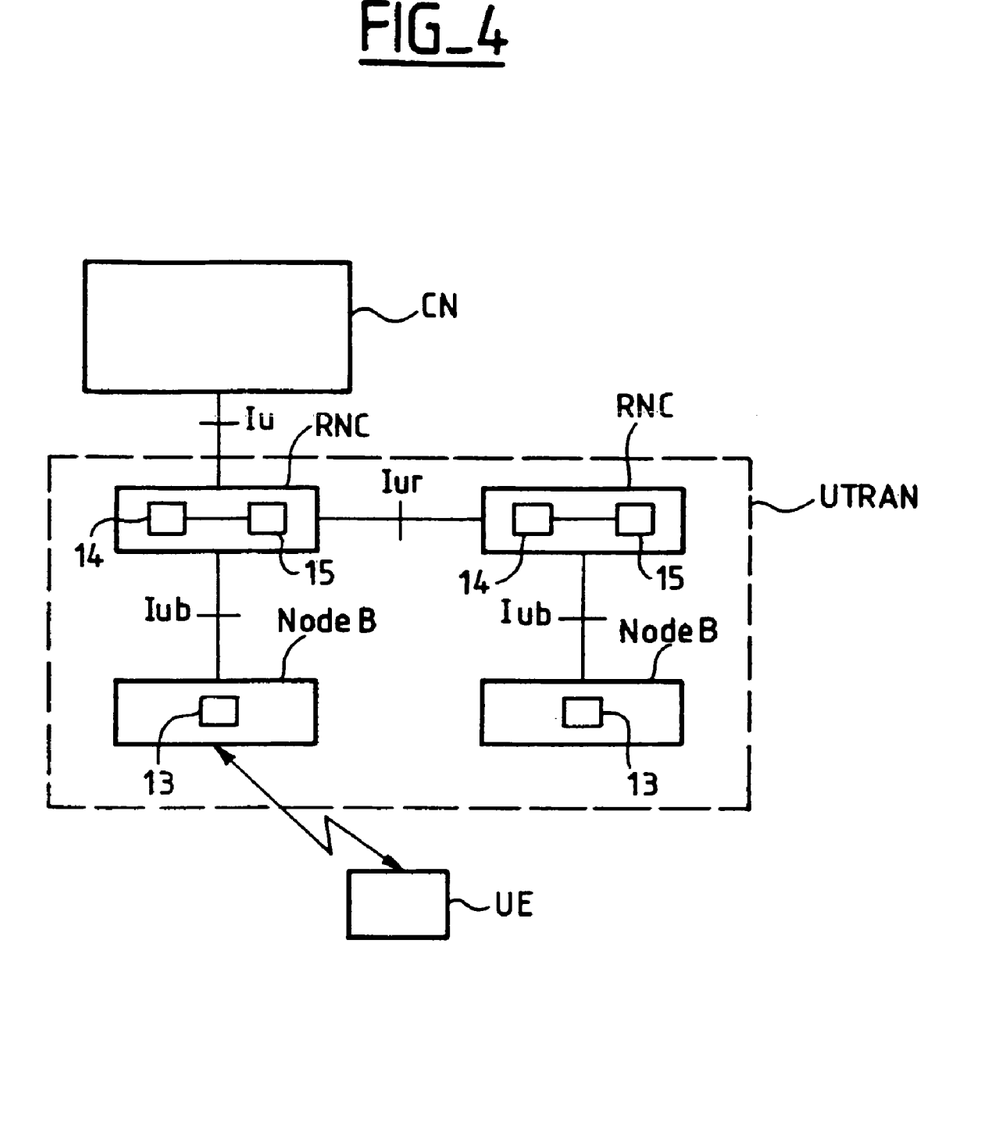
FIG. 4 is a diagram showing one embodiment of a method according to the invention.

FIG. 4 is a diagram illustrating one example of the means for implementing the above method in accordance with the invention to be provided in a base station (in a Node B in the UMTS) and in a base station controller (in an RNC in the UMTS).

A base station (a Node B in the UMTS) therefore includes, in addition to other means that can be standard means:

- means 13 for signaling to a base station controller its global processing capacity, or capacity credit, and the amount of that global processing capacity, or cost, as a function of the necessary resources.

A base station controller (a controlling radio network controller (CRNC) in the UMTS) therefore includes, in addition to other means that can be standard means:

- means 14 for receiving from a base station its global processing capacity, or capacity credit, and the amount of that global processing capacity, or cost, as a function of the necessary resources, and
- means 15 for updating the capacity credit on the basis of the consumption law, said updating being effected in the case of a first radio link on the basis of the cost for the dedicated channel and a cost for the associated common channel and in the case of an additional radio link on the basis of the cost for the dedicated channel only.

The above means can operate in accordance with the method previously described; their specific implementation will not represent any particular problem to the person skilled in the art, so they do not need to be described here in more detail than stating their function.

In the above description, the cost can be a function of the spreading factor, as specified in the current version of the standard previously referred to. The principle as described is not limited to this situation, however, and applies equally to the situation in which the cost is a function of one or more other parameters, such as the bit rate in particular.

A second problem is that the standard does not at present cover a variable spreading factor and/or a variable number of spreading factors.

The solution in accordance with the invention to this second problem can be explained in the following terms.

In the uplink direction, the spreading factor can vary as a function of the amount of data that the UE has to send (the manner of choosing the spreading factor and the number of spreading codes is standardized). The CRNC has no a priori knowledge of the spreading factor and cannot take the spreading factor into account in updating the capacity credit.

The proposed solution is to update the capacity credit on the basis of a reference spreading factor. Said reference spreading factor is advantageously the minimum spreading factor. This can be determined relatively easily because it depends mainly on the maximum bit rate that is part of the definition of the service (note that the choice of the minimum spreading factor is not standardized and therefore depends on the manufacturer).

In a first embodiment the minimum spreading factor has a predetermined value, which is a function of the type of service in particular. For more flexibility, the predetermined value can be adjusted by means such as Operation & Maintenance (O&M) means, for example.

In this first embodiment, if the SRNC is different from the CRNC, the SRNC can fix the minimum spreading factor which can be signaled to the CRNC at the Iur interface by means of "Radio Link Addition Request" and "Radio Link Set-Up Request" messages, the corresponding information element (IE) being the Minimum UL Channelization Code Length. The CRNC then also signals the minimum spreading factor to the Node B with messages of the same type at the Iub interface.

In a second embodiment, the minimum spreading factor can be calculated, in particular from a transport format combination set (TFCS) parameter that is usually signaled, employing procedures specified in the corresponding standards, for the dedicated channels (or radio link procedures), or for the common transport channels.

One feature of the UMTS is the possibility of transporting more than one service on the same connection, i.e. more than one transport channel on the same physical channel. The transport channels (TrCH) are processed separately, in accordance with a channel coding scheme (including error detector coding, error corrector coding, bit rate adaptation and interleaving, as described with reference to FIG. 2) before being time division multiplexed to form a coded composite transport channel (CCTrCH) sent over one or more physical channels. More information on these aspects of the UMTS can be found in the document 3G TS25 212 V3.5.0 published by the 3GPP.

Another feature of the UMTS is that it authorizes variable bit rates for users during a call. The data transported by the transport channels is organized into data units known as transport blocks received at a period called the transmission time interval (TTI). The number and the size of the transport blocks received on a given transport channel vary as a function of the bit rate, and the transport format is defined as the known number and size of these transport blocks (and therefore the instantaneous bit rate) for a given transport channel. The transport format combination (TFC) is defined as a combination of transport formats authorized for different transport channels to be multiplexed on the same coded composite transport channel (CCTrCH). Finally, the transport format combination set (TFCS) is defined as the set of possible combinations of transport formats. More information on these aspects of the UMTS can be found in the document TS 25.302 V.3.7.0 published by the 3GPP.

The standard 3G TS 25.212 specifies how to choose the uplink spreading factor as a function of the TFC. The CRNC can therefore also calculate from the TFCS the minimum spreading factor for all the TFC in the TFCS; more generally, the CRNC can calculate a reference spreading factor on the basis of the TFCS regardless of the calculation method used.

This second embodiment is slightly more complex, but may be the only solution when the minimum spreading factor is not fixed, as is the case for the physical common packet channel (PCPCH), for example.

Similarly, the capacity credit can be updated on the basis of a reference number of spreading codes (or here the number of dedicated physical data channels (DPDCH) for the uplink direction), this reference number advantageously being a maximum number, signaled by the SRNC to the CRNC by means of the Maximum Number Of UL Dpdchs information element (IE). The number of uplink DPDCH can also vary and the CRNC therefore has no a priori knowledge of this number either.

Generally speaking, to solve this second problem, in the case of a variable spreading factor and/or variable number of spreading codes, the invention essentially provides for the updating to be effected on the basis of a reference spreading factor and/or a reference number of spreading codes.

In an advantageous embodiment, the reference spreading factor for the uplink direction is the minimum spreading factor signaled in the "Radio Link Setup Request" message (by means of the Minimum UL Channelization Code Length IE).

Likewise, the reference number of spreading codes for the uplink direction is the maximum number signaled in the "Radio Link Setup Request" message (by means of the Maximum Number Of UL DPDCH IE).

Note also that what is stated above for the uplink direction can also apply to the downlink direction or to the uplink and downlink directions simultaneously.

FIG. 4 can also serve as an illustration of one example of the means for implementing the above method in accordance with the invention to be provided in a base station (in a Node B in the UMTS) and in a base station controller (in an RNC in the UMTS).

A base station (Node B) therefore includes, in addition to other means that can be standard means:
  means 13 for signaling to a base station controller its global processing capacity, or capacity credit, and the amount of said global processing capacity, or cost, for different spreading factor values.

A base station controller (controlling radio network controller (CRNC) in the UMTS) therefore includes, in addition to other means that can be standard means:
  means 14 for receiving from a base station its global processing capacity, or capacity credit, and the amount of said global processing capacity, or cost, for different spreading factor values, and
  means 15 for updating the capacity credit on the basis of the consumption law, said updating being effected, in the case of a variable spreading factor and/or variable number of spreading codes, on the basis of a reference spreading factor and/or a reference number of spreading codes.

In a first embodiment, the means 15 can include:
  means for receiving a predetermined value of the reference spreading factor and/or reference number of spreading codes, signaled to the base station controller (CRNC) by a different base station controller (SRNC).

In a second embodiment the means 15 can include:
  means for calculating a reference spreading factor value from a parameter signaled to the base station controller (CRNC) by a separate base station controller (SRNC).

Another possibility is for the means 15 to include:
  means for receiving a reference spreading factor value signaled by a separate base station controller (SRNC) which calculates it for itself.

The above means can operate in accordance with the method previously described; their specific implementation will not represent any particular problem to the person skilled in the art, so they do not need to be described here in more detail than stating their function.

A third problem is that the standard does not at present cover multicode transmission.

The solution in accordance with the invention to this third problem can be explained in the following terms.

Multicode transmission uses a plurality of spreading codes (also called channelization codes) for the same coded composite transport channel (CCTrCh).

The simplest solution is to consider that the cost for N codes is simply the sum of the costs for the individual codes (N times the cost of a code if the spreading codes have the same spreading factor), or more generally to derive the cost for N codes as a function of the cost for one code. This would avoid additional signaling and provide a simpler way to take account of multiple codes.

It would also be possible to consider the cost of N codes as corresponding to the cost of whichever of the N codes has the lowest spreading factor, although this seems less logical because processing N codes can be very different from processing one code.

Another possibility is to signal the costs for various numbers N of codes (one for each number of codes and for each spreading factor). This would necessitate more signaling, however, but could nevertheless be a possibility in the uplink direction because multiple codes are authorized only for the minimum spreading factor. Thus limited signaling would be necessary.

As a general rule, to solve this third problem the invention therefore essentially provides for said updating to be effected on the basis of the cost for at least one of the N spreading codes in the case of multicode transmission using N spreading codes.

In an advantageous embodiment, the costs for the dedicated channels given in the consumption law are costs per spreading code (channelization code). If multiple spreading codes are used either by the radio links (dedicated channels) or by the PDSCH, the cost credited to or debited from the capacity credit is taken as N times the cost of a code, where N is the number of codes.

Similarly, in an advantageous embodiment, the costs for the common channels given in the consumption law are costs per spreading code (channelization code). If a physical channel uses multiple spreading codes, the cost credited to or debited from the capacity credit is taken as N times the cost of a code, where N is the number of codes.

FIG. 4 can also serve as an illustration of one example of the means for implementing the above method in accordance with the invention to be provided in a base station (in a Node B in the UMTS) and in a base station controller (in an RNC in the UMTS).

A base station (Node B) then includes, in addition to other means that can be standard means:
  means 13 for signaling to a base station controller its global processing capacity, or capacity credit, and the amount of that global processing capacity, or cost, for different spreading factor values.

A base station controller (controlling radio network controller (CRNC)) therefore includes, in addition to other means that can be standard means:
  means 14 for receiving from a base station its global processing capacity, or capacity credit, and the amount of that global processing capacity, or cost, for different spreading factor values, and
  means 15 for updating the capacity credit on the basis of the consumption law, said updating being effected, in the case of multicode transmission using N spreading codes, on the basis of the costs for at least one of the N spreading codes.

These above means can operate in accordance with the method described previously; their specific implementation will not represent any particular problem to the person skilled in the art, so they do not need to be described here in more detail than stating their function.

Note that the term "updating" used with reference to the capacity credit throughout the foregoing description is intended to cover not only operations by which the capacity credit is debited, in the event that new radio resources are required, but also operations by which the capacity credit is credited, in the event that the new radio resources are no longer necessary and are therefore returned.

In particular:
  the capacity credit is debited for radio link set-up, radio link addition and common transport channel set-up procedures,
  the capacity credit is credited for radio link deletion and common transport channel deletion procedures,
  the capacity credit is debited or credited for radio link reconfiguration and common transport channel reconfiguration procedures, according to whether the difference between the allocation costs for the new bit rate and the old bit rate is negative or positive.

In addition, another object of the present invention is to propose a load control and/or call admission control method taking account of the processing capacity of a base station determined by the above credit mechanism.

Essentially, in this method:
  if the uplink and/or downlink capacity credit falls below a first given threshold, the call admission control procedure can reject any new call until the capacity credit is again greater than a second given threshold greater than or equal to the first threshold,
  in addition, an overload control procedure can be initiated if the capacity credit falls below a given threshold, which can be equal to one of the previous thresholds.

The present invention also provides a mobile radio system and a base station controller for implementing the above method.

In the above description, the cost can be a function of the spreading factor, as specified in the current version of the standard previously referred to. However, the principle described is not limited to this situation, and applies equally well to the situation in which the cost is a function of one or more other parameters, such as the bit rate in particular.

The invention claimed is:

1. A method of managing processing resources in a mobile radio system, in which a first entity manages radio resources and corresponding processing resources, the processing resources being provided in a second entity separate from the first entity, the method comprising:
  transmitting, from the second entity to the first entity, a capacity credit, and a consumption law for updating the capacity credit as a function of at least a spreading factor; and
  updating at the first entity the capacity credit on the basis of the consumption law,
  wherein in the case of a variable spreading factor and/or a variable number of spreading codes, said updating is effected on the basis of a reference spreading factor and/or a reference number of spreading codes.

2. A method according to claim 1, wherein said reference spreading factor is a minimum spreading factor.

3. A method according to claim 1, wherein said reference number of spreading codes is a maximum number of spreading codes.

4. A method according to claim 2, wherein said minimum spreading factor has a predetermined value.

5. A method according to claim 2, wherein said minimum spreading factor is a function of the type of service in particular.

6. A method according to claim 2, wherein said minimum spreading factor is adjustable by operation and maintenance means.

7. A method according to claim 2, wherein said first entity corresponds to a controlling radio network controller, and said minimum spreading factor is signaled to the first entity by a separate entity corresponding to a serving radio network controller.

8. The method according to claim 7, wherein said minimum spreading factor is signaled in a "Radio Link Set-Up" message.

9. The method according to claim 8, wherein said minimum spreading factor is signaled in an Information Element "Min UL Channelisation Code Length".

10. A method according to claim 2, wherein said spreading factor has a calculated value.

11. A method according to claim 10, wherein said calculated value is obtained from a parameter corresponding to a transport format combination set.

12. A method according to claim 11, wherein said first entity corresponds to a controlling radio network controller, said calculated value is calculated in the first entity from said parameter signaled to the first entity by a separate entity corresponding to a serving radio network controller.

13. A method according to claim 11, wherein said first entity corresponds to a controlling radio network controller, and said calculated value is signaled to the first entity by a separate entity corresponding to a serving radio network controller which calculates said calculated value from said parameter.

14. A mobile radio system comprising:
a first entity which manages radio resources and corresponding processing resources; and
a second entity providing the processing resources, the second entity transmitting to the first entity a capacity credit and a consumption law for updating the capacity credit as a function of at least a spreading factor;
wherein the first entity comprises means for updating the capacity credit on the basis of the consumption law, wherein in the case of variable spreading factor and/or variable number of spreading codes, said updating is effected on the basis of a reference spreading factor and/or a reference number of spreading codes.

15. The mobile radio system according to claim 14, wherein said first entity corresponds to a controlling radio network controller and comprises means for receiving a minimum spreading factor signaled to said first entity by a separate entity corresponding to a serving radio network controller.

16. A mobile radio system according to claim 15, wherein said first entity comprises means for receiving a minimum spreading factor signaled to said controlling radio network controller by said separate entity in a "Radio Link Set-Up" message.

17. A mobile radio system according to claim 16, wherein said first entity comprises means for receiving a minimum spreading factor signaled to said controlling radio network controller by said separate entity in an Information Element "Min UL Channelisation Code Length".

18. A base station controller for managing radio resources and corresponding processing resources in a mobile radio system including a base station providing the processing resources, said base station controller comprising:
means for receiving from a base station a capacity credit and a consumption law for updating the capacity credit as a function of at least a spreading factor; and
means for updating the capacity credit on the basis of the consumption law, wherein in the case of a variable spreading factor and/or a variable number of spreading codes, said updating is effected on the basis of a reference spreading factor and/or a reference number of spreading codes.

19. A base station controller according to claim 18, wherein said base station controller corresponds to a controlling radio network controller, and said base station further comprising means for receiving a reference spreading factor and/or a reference number of spreading codes value signaled to said base station controller, a separate base station controller corresponding to a serving radio network controller.

20. A base station controller according to claim 19, comprising means for receiving a minimum spreading factor signaled to said base station controller, corresponding to a controlling radio network controller, by said separate base station controller, corresponding to a serving radio network controller, in a "Radio Link Set-Up" message.

21. A base station controller according to claim 20, comprising means for receiving a minimum spreading factor signaled to said base station controller, corresponding to a controlling radio network controller, by said separate base station controller, corresponding to a serving radio network controller, in an Information Element "Min UL Channelisation Code Length".

22. A base station controller according to claim 18, further comprising means for calculating a reference spreading factor value from a parameter signaled to said base station controller by a separate base station controller.

23. A base station controller according to claim 18, further comprising means for receiving a reference spreading factor value signaled by a separate base station controller which calculates the reference spreading factor value.

24. A radio network controller comprising:
means for receiving from a base station a capacity credit and a capacity consumption law, and
means for, in the case of a variable spreading factor, updating the capacity credit on the basis of the capacity consumption law and a reference spreading factor.

25. A radio network controller according to claim 24, wherein said reference spreading factor corresponds to a minimum spreading factor.

26. A radio network controller according to claim 25, wherein, for a Physical Common Packet Channel (PCPCH), said reference spreading factor is calculated from a Transport Format Combination Set (TFCS).

27. A radio network controller according to claim 25, wherein, for a Physical Common Packet Channel (PCPCH), said reference spreading factor is calculated from a Transport Format Combination Set (TFCS).

28. A radio network controller according to claim 24, wherein said reference spreading factor is signalled to said radio network controller in a message "Radio Link Setup Request Message".

29. A radio network controller according to claim 24, wherein said reference spreading factor is signalled to said radio network controller in a message "Radio Link Setup Request Message".

30. A radio network controller according to claim 28, wherein said reference spreading factor is signalled to said radio network controller in an Information Element "Min UL Channelisation Code Length" of said message.

31. A radio network controller comprising:
means for receiving from a base station a capacity credit and a dedicated channels capacity consumption law, and
means for, in the case of a variable spreading factor, updating the capacity credit on the basis of the dedicated channels capacity consumption law and a reference spreading factor signaled to said radio network controller in an Information Element "Min UL Channelisation Code Length" of a message "Radio Link Setup Request Message".

32. A radio network controller comprising:

means for receiving from a base station a capacity credit and a common channels capacity consumption law, and means for, in the case of a variable spreading factor, and for a Physical Common Packet Channel (PCPCH), updating the capacity credit on the basis of the common channels capacity consumption law and a reference spreading factor calculated from a Transport Format Combination Set (TFCS).

* * * * *